United States Patent [19]
Kondo et al.

[11] Patent Number: 5,173,770
[45] Date of Patent: Dec. 22, 1992

[54] MOVEMENT VECTOR DETECTION DEVICE

[75] Inventors: Toshiaki Kondo, Atsugi; Masayoshi Sekine, Tokyo, both of Japan

[73] Assignee: Canon Kabushiki Kaisha, Tokyo, Japan

[21] Appl. No.: 852,494

[22] Filed: Mar. 17, 1992

Related U.S. Application Data

[63] Continuation of Ser. No. 691,783, Apr. 26, 1991.

[30] Foreign Application Priority Data

Apr. 27, 1990 [JP] Japan .................................. 2-113952

[51] Int. Cl.$^5$ .......................................... H04N 5/232
[52] U.S. Cl. ........................................ 358/105; 358/222
[58] Field of Search .................. 358/105, 222, 125, 126

[56] References Cited

U.S. PATENT DOCUMENTS

| | | | |
|---|---|---|---|
| 4,677,476 | 6/1987 | Kondo | 358/105 |
| 4,959,725 | 9/1990 | Mandle | 358/105 |
| 5,012,270 | 4/1991 | Sekine et al. | 354/430 |
| 5,031,049 | 7/1991 | Toyama et al. | 358/227 |
| 5,053,876 | 10/1991 | Blisett | 358/105 |

FOREIGN PATENT DOCUMENTS 210861 2/1987 European Pat. Off. .
1594342 7/1981 United Kingdom .

Primary Examiner—Howard W. Britton
Attorney, Agent, or Firm—Fitzpatrick, Cella, Harper & Scinto

[57] ABSTRACT

Movement vector detection device comprises a concentration difference operation circuit to compute a concentration difference between image planes, space gradient operation circuit to compute an average space gradient of a current image plane and a preceding image plane, concentration difference correction circuit to correct by the sign of space gradient the concentration difference obtained by concentration difference operation circuit, first totalizing circuit to computes the total sum in a prescribed block of the outputs from the concentration difference correction circuit, second totalizing circuit to compute the total sum in a prescribed block of the absolute value of average space gradient by the space gradient operation circuit and division circuit to divide the outputs from the first totalizing circuit by outputs from the second totalizing circuit.

27 Claims, 6 Drawing Sheets

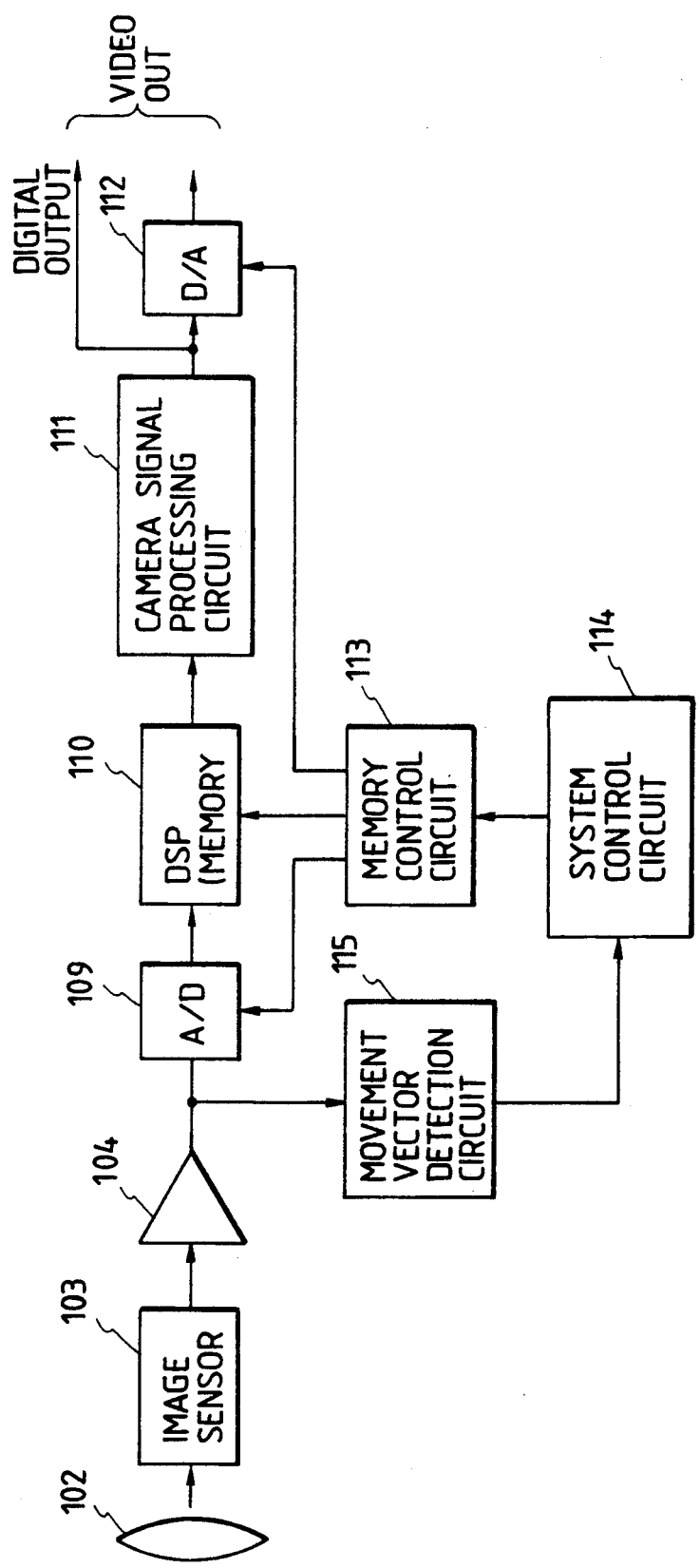

MOVEMENT VECTOR DETECTION DEVICE

This application is a continuation of application Ser. No. 07/691,783 filed Apr. 26, 1991.

BACKGROUND OF THE INVENTION

1. Field of the Invention

The present invention relates to a movement detection device, and more specifically, to a device which detects movement vectors from image signals.

2. Related Background Art

One method to detect movement vectors by image signal processing is the time-space gradient method which is described in the Japanese Patent Publication No. 60-46878, in J. O. Limb and J.A. Murply, "Measuring the Speed of Moving Objects from Television Signals", IEEE Trans. Com./ Com-23, 4, pp. 474–487 (Apr. 1975) and also in other publications. In the space gradient method the amount of movement of each point is computed by the following basic formula:

$$\alpha = \Sigma_B d \cdot sign(g'x)/\Sigma_B |g'_x|$$

$$\beta = \Sigma_B d \cdot sign(g'y)/\Sigma_B |g'_y|$$

where "$\alpha$" and "$\beta$" represent the movement amounts in the x and y directions, respectively; "d" represents the concentration difference among time-sequential images of one given point, namely, the time gradient; and "$g'_x$" and "$g'_y$" represent the space gradients in the x and y directions, respectively, when the image is expressed as "g". And "$\Sigma_B$" represents the computed grand total in a block and "sign( )" is the function which outputs the signal of "$g'_x$" and "$g'_y$".

In conventional examples, the detection range has no limits if the spacial concentration distribution of the input images is liner, that is, if the space gradient of the image concentration is constant. In practice, however, the spacial concentration distribution of an image varies in random cycles, therefore, the conventional method has the disadvantage of not being easily applicable to large movements.

SUMMARY OF THE INVENTION

The first objective of the present invention is to provide a movement vector detection device which solves the aforesaid disadvantage.

The second objective of the present invention is to provide a movement vector detection device which has a wide detection range to images, the space gradient of which is not constant but changes randomly.

The third objective of the present invention is to provide a movement vector detection device that is capable of more accurately detecting the movement vector of images whose space gradient changes with time and is capable of being applied to large movement images, because, in the space gradient computation, the average space gradient is computed under given weights of the preceding image plane and the current image plane.

The fourth objective of the present invention is to provide a movement vector detection device which has an enhanced detection range of movement vectors without any substantial extension of circuits.

In order to achieve such an objective, a preferred embodiment of the present invention discloses a movement detection device comprising concentration difference operation means which operates the concentration difference between images; space gradient operation means which operates the space gradient in an image plane; averaging means which averages, with giving predetermined weights, the outputs of the space gradient operation means for images different in time; and movement vector operation means which operates the movement vector of the image, based on the outputs of the concentration difference operation means and of the averaging means.

A preferred embodiment of the present invention discloses a movement detection device having concentration difference operation means which operate the concentration difference between images; a space gradient operation means which operate the average space gradients, under predetermined weights, of the current and preceding image planes; correction means which corrects the concentration difference operated by the concentration difference operation means with the space gradient signal; a first totalizing means which totalizes the outputs of the correction means in a given block; second totalizing means which totalizes the absolute values of the average space gradient operated by the space gradient operation means in a given block, and division means which decide the output of the first totalizing means and the output of the second totalizing means.

The fifth objective of the present invention is to provide a vibration correction device which corrects the image movement in accordance with the movement vector which is output from the vector detection unit.

In order to achieve such an objective, a preferred embodiment of the present invention discloses a movement adjustment device having concentration difference operation means which operate the concentration difference between image planes; space gradient operation means which operate the space gradient in an image plane; averaging means which average, with giving predetermined weights, the outputs of the space gradient operation means for image planes different in time; movement vector operation means which operate the movement vector of image, based on the outputs of the concentration difference operation means and of the averaging means; correction means which correct the movement of the image in accordance with the output of the movement vector operation means.

The sixth objective of the present invention is to provide a video camera comprising a vibration correction function having a broad range of vibration detection.

In order to achieve such an objective, a preferred embodiment of the present invention discloses a video camera having image pickup means, a time gradient operation means which operates the time gradient between image planes from the image pickup signals that are output by the image pickup means, space gradient operation means which operates the space gradient in the image plane from the image pickup signals, averaging means which averages the outputs of the space gradient operation means with giving predetermined weights thereto, a movement vector operation means which operates the movement vector of the image in accordance with the outputs of the time gradient operation means and the averaging means, and correction means which corrects the movement of the image in accordance with the output of the movement vector operation means.

Other objectives, features and advantages of the present invention will become more-fully apparent from the following detailed description of the preferred embodiments taken in connection with the accompanying drawings.

BRIEF DESCRIPTION OF THE DRAWINGS

FIGS. 10 and 11 show the block diagrams of embodiments where the movement vector detection devices in the present invention are each applied to the image vibration adjustment devices.

DETAILED DESCRIPTION OF THE PREFERRED EMBODIMENTS

With reference to the drawings, embodiments of the movement vector detection devices of the present invention are explained below.

Figure 1:
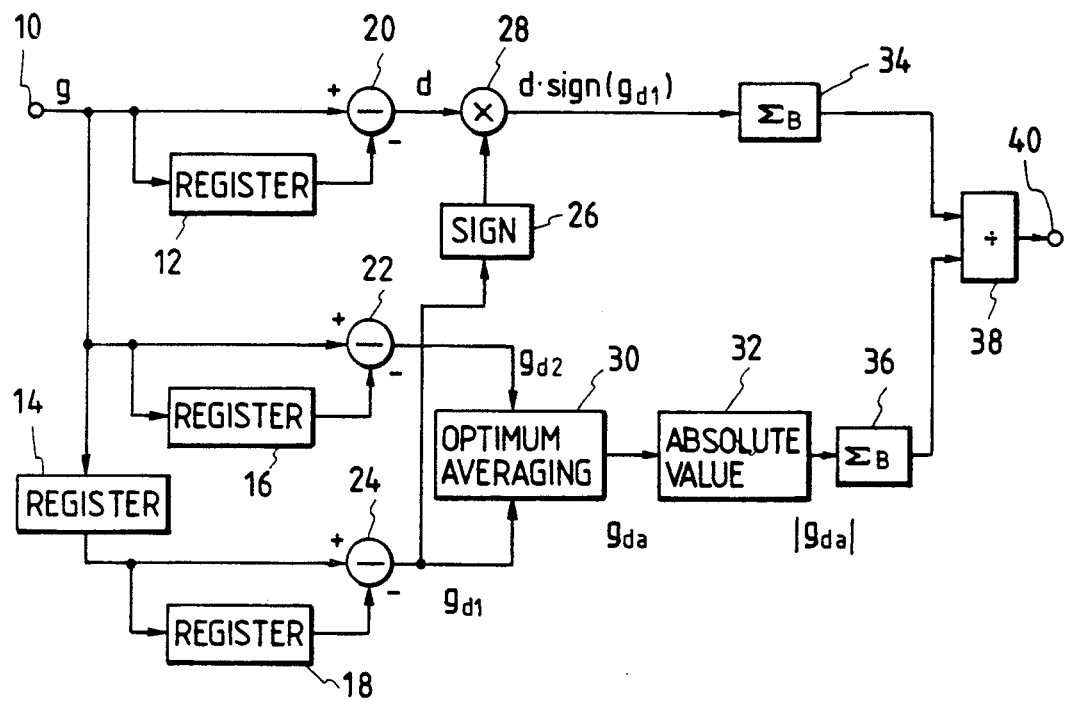
FIG. 1 shows the block diagram of one embodiment of the present invention.

FIG. 1 shows the block diagram of one embodiment of the present invention. The input terminal 10 inputs image signals; 12 and 14 are registers which memorize (that is, delay) the input signals for one field period (or one frame period); 16 and 18 are registers which memorize (that is, delay) the input signals only for the scanning time of several pixels that are required for the operation of the space gradient of the image concentration distribution; 20, 22 and 24 are subtractors; 26 is the sign output circuit which outputs the signal showing the sign (positive, negative or zero) of the input signal (output of subtractor 24); 28 is the multiplier; 30 is the optimum averaging circuit which averages the two inputs after giving proper weights; 32 is the absolute value circuit which outputs the absolute value of the output signal of the optimum averaging circuit 30; 34 and 36 are the totalizing circuits which accumulate the data in the designated block for detection of the movement vector; 38 is the divider which divides the output of totalizing circuit 34 by the output of totalizing circuit 36; 40 is the output terminal of the signal which shows the image movement amount in the horizontal or vertical direction.

An explanation of actions in FIG. 1 is given as follows. The image signal "g" which is input to input terminal 10, is separated into three channels. Firstly, the concentration difference between the time sequential two field (or frame) image planes, that is, the time gradient "d", is computed by register 12 and subtractor 20. Secondly, the space gradient "$g_{d2}$" of the current image plane (field or frame) is computed by register 16 and subtractor 22, and thirdly, the space gradient "$g_{d1}$" of the preceding image plane (field or frame) is computed by register 18 and subtractor 24 by the use of the image signal of the preceding field (or frame) of register 14.

The optimum averaging circuit 30 gives the optimum weight to the space gradients "$g_{d1}$" and "$g_{d2}$" between the preceding and current image planes, and averages them. For example, if $g_{d1}:g_{d2}=3:1$, the optimum averaging circuit 30 outputs an average value "$g_{da}$" which is expressed by:

$$g_{da} = (\tfrac{3}{4})g_{d1} + (\tfrac{1}{4})g_{d2}. \tag{1}$$

The absolute value circuit 32 takes the absolute value of the output "$g_{da}$" of the optimum averaging circuit 30 and feeds it to the totalizing circuit 36. The totalizing circuit 36 computes the total sum of the outputs "$|g_{da}|$" of absolute value circuit 32 in the block consisting of a prescribed number of pixels, and sends the total sum to the denominator input of divider 38.

The sign output circuit 26 outputs "+1" if the space gradient "$g_{d1}$" is positive, "0" if $g_{d1}$ quotes to is zero, and "−1" if $g_{d1}$ quotes to is negative. The multiplier 28 multiplies the output of sign output circuit 26 by the time gradient "d" (the output of subtractor 20). Thus, the time gradient in the direction of the space gradient is obtained. The totalizing circuit 34 computes the total sum of the output of the multiplier 28 for each block. The output of the totalizing circuit 34 is sent to the numerator input of the divider 38. The divider 38 divides the output of the totalizing circuit 34 by the output of the totalizing circuit 36. The result of the division by the divider 38 represents the movement amount in the direction of space gradient of each designated block, and the movement amount of each block in the horizontal or vertical direction is obtained from output terminal 40.

Figure 2:
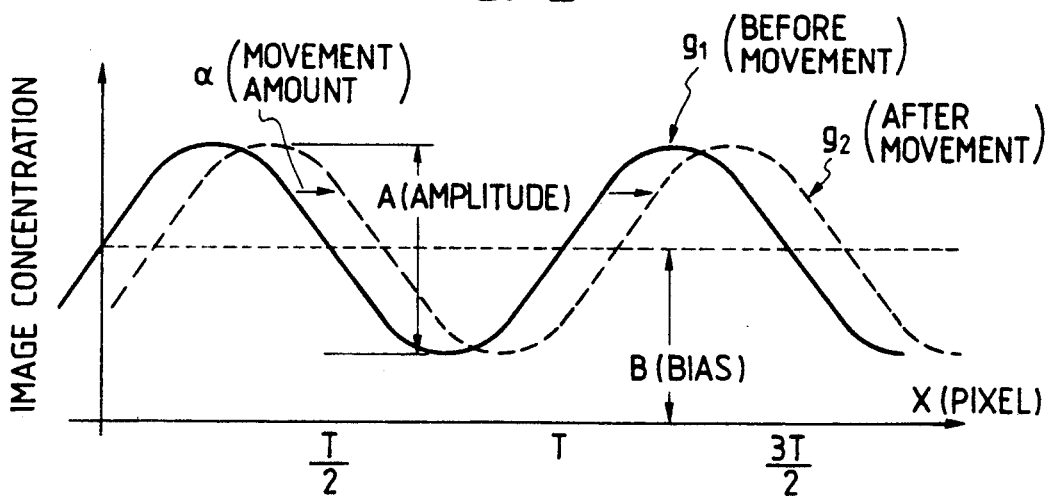
FIG. 2 shows the cross-section of an image pattern where the frequency is "T"

Next, with reference to FIGS. 2 through 5, the optimum determination method and its effect at the optimum averaging circuit 30 are explained. For the purpose of simplification, the image concentration distribution is assumed to be one of the one-dimensional sine curves, and its graph is shown in FIG. 2. In FIG. 2, the vertical axis shows the concentration value of the image, and the horizontal axis shows the position in the image plane. "A" represents the height of the sine curve, "B" represents the bias, "T" represents the cycle, "$g_1$" represents the image before movement, and "$g_2$" represents the image after it moved by "α". If the time-space gradient method is applied to the sine curve shown in FIG. 2, when expressing the time gradient as "d(x)" and the partial derivative of $g_1$ in x direction (space gradient) as "$g_{d1}(x)$", then:

$$d(x) = g_1 - g_2 \tag{2}$$
$$= A\{\sin \omega x - \sin \omega(x - \alpha)\}$$

where: $\omega = 2\pi/T$

Consequently, the estimated movement amount "e(α)" is given from the aforesaid basic formula as:

$$e(\alpha) = \Sigma_B d(x) \cdot \text{sign}(g_{d1})/\Sigma_B |g_{d1}| \tag{4}$$

$\Sigma_B$ corresponds to the total sum in the block computed by the totalizing circuits 34 and 36. To estimate the movement amount "e(α)" in the case of the block size being equal to the pattern cycle "T":

$$e(a) = (T/2\pi) \sin \omega a \quad (5)$$
$$= (T/2\pi) \sin (2\pi a/T)$$

Figure 3:
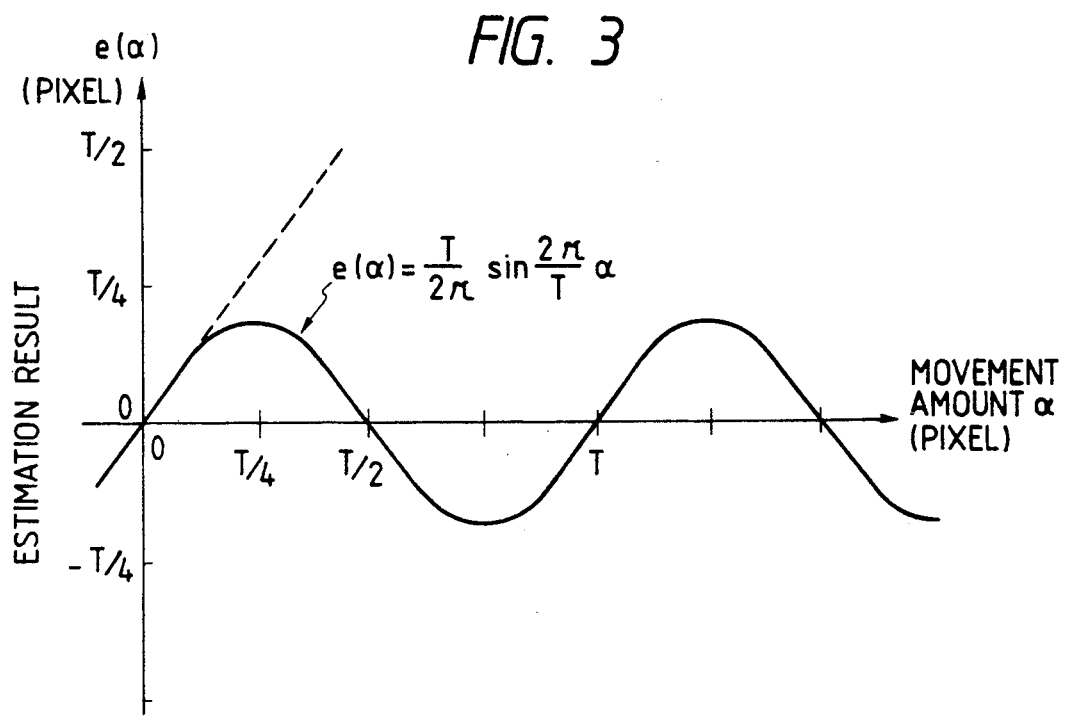
FIG. 3 shows the results of estimation when the movement amounts are estimated by the application of time-space gradient method to the frequency T pattern.

FIG. 3 illustrations of the above where the horizontal axis shows the movement amount "a" of the pixel unit and the vertical axis represents the estimation result of the pixel unit.

Likewise, the estimation result when simply averaging the gradients of two field (or frame) images is:

$$e(a) = (T/\pi) \tan (\pi a/T) \quad (6)$$

Figure 4:
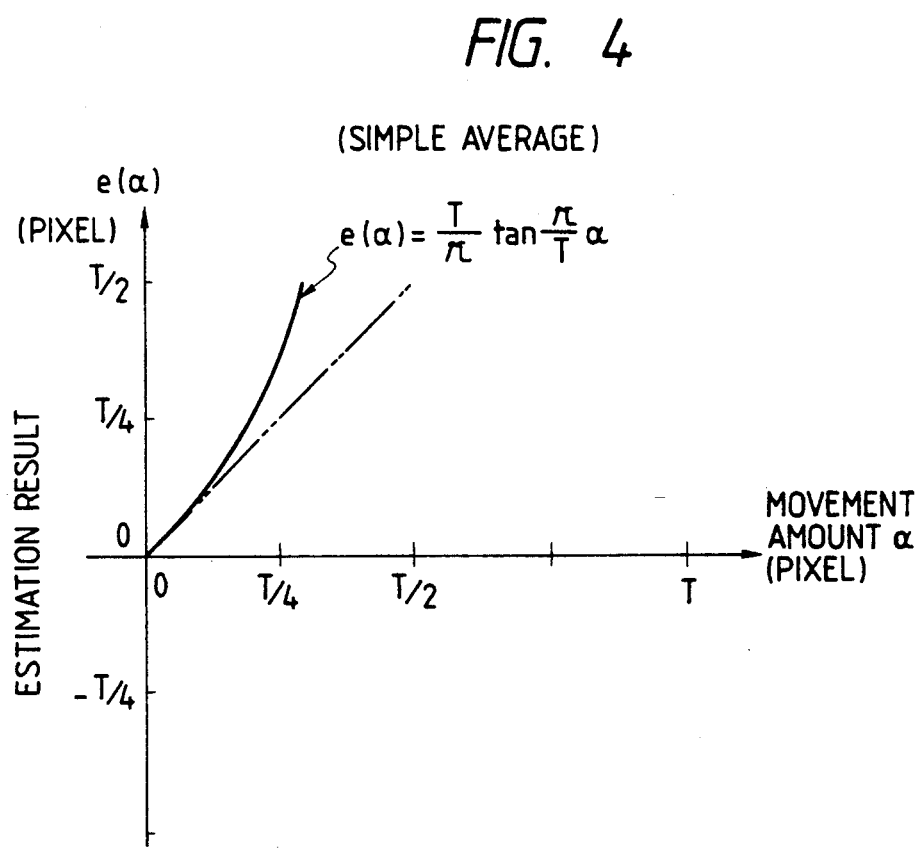
FIG. 4 shows the results of estimation by the average gradient method.

This case is illustrated in FIG. 4. When assuming the image is one of the sine curves, the average gradient becomes zero when the movement amount is T/2, and therefore the estimation results disperses at $a = T/2$; However, this phenomena cannot take place in reality. Generally, some characteristic improvement is achieved by averaging the space gradients of the preceding and current field (or frame) images rather than by using only the space gradient of the preceding field (or frame) image which serves as the base.

By the extension of the idea of averaging the space gradients, it is conceived that such averaging be done with optimum weighing. Normally, if the reference ratio of the space gradient of the base preceding field (or frame) image and the space gradient of the current field (or frame) is n:1, then the estimation result in this case is expressed by the following formula:

$$e(a) = \frac{(n + 1)^2 \sin \omega a}{\omega(n^2 + 2n \cos \omega a + 1)} \quad (7)$$

where: $\omega = 2\pi/T$

Figure 5:
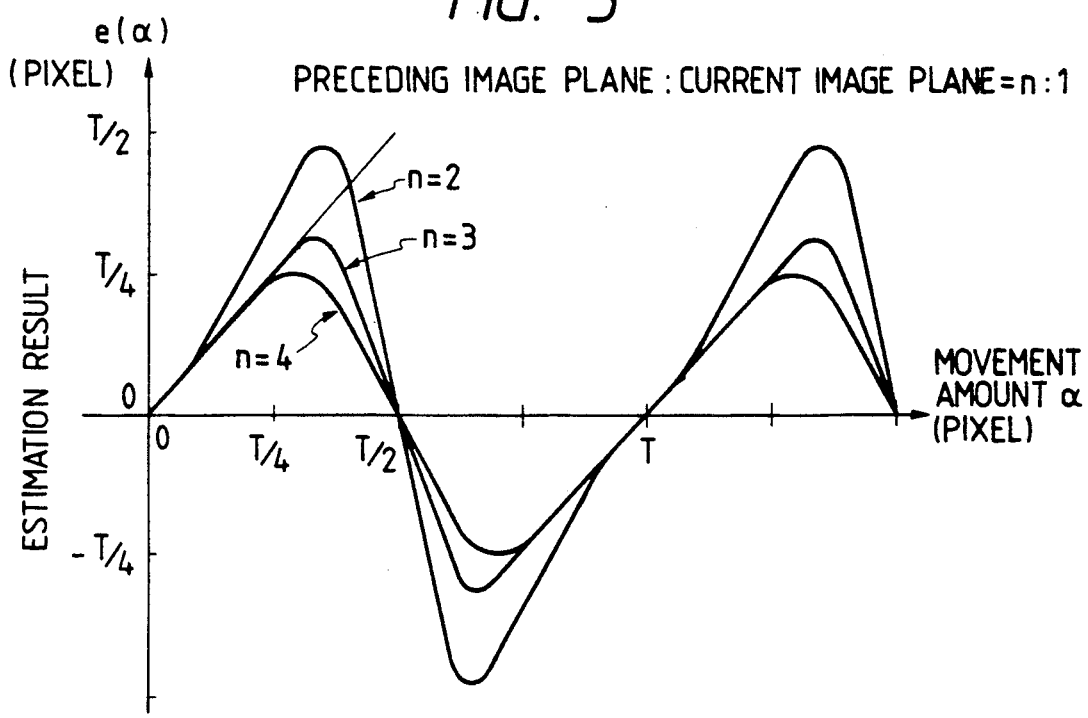
FIG. 5 shows the results of estimation by the embodiment of FIG. 1.

Formula (7) is equal to formula (5) when $n = +\infty$, and is equal to formula (6) when $n = 1$. Estimation results when $n = 2, 3$ and $4$ are illustrated in FIG. 5. Comparison of it with FIGS. 3 and 4 shows that the detection range is considerably broadened, particularly when $n = 3$.

Next the effective range of n, which is the reference specific gravity of the space gradient of the preceding image plane to the space gradient of the current image plane, is explained. If the conditions are such that, when the movement amount "a" $= \pm T/8$, the error between the true value (namely $\pm T/8$) and the estimation result is no more than $\pm 5\%$, the range of reference specific gravity "n" for it to be effective for the weighing can be:

$$1.4 \leq n \leq 9$$

Figure 6:
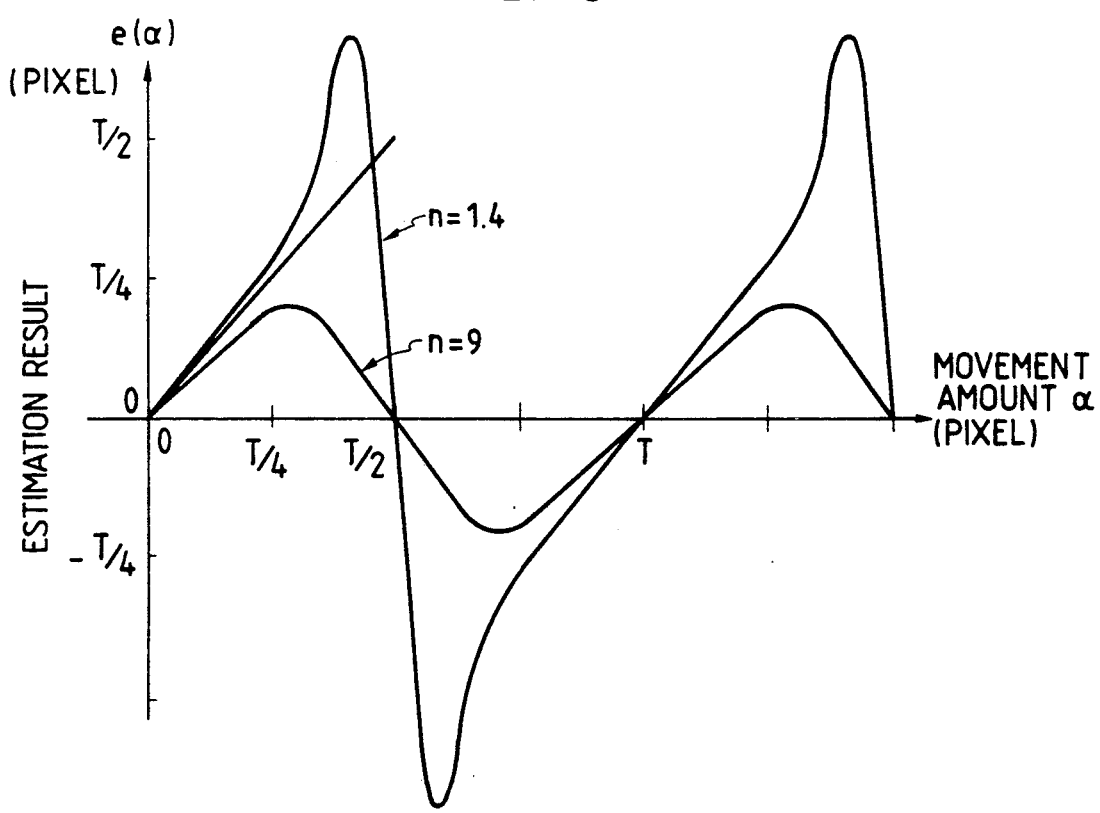
FIG. 6 illustrates the effective range of weights.

The estimation results when $n = 1.4$ and when $n = 9$ are shown in FIG. 6.

When $n = 1$, that is, when the simple average gradient method is employed, the ratio of error to the true value when $a = \pm T/8$ is 5.5%, and when $n = \infty$, that is, when the conventional method which uses the space gradient of the preceding image plane only, an error of 10% occurs, but the use of weighted average gradient within the range of $1.4 \leq n \leq 9$ controls the error to no more than $\pm 5\%$. The foregoing is the result of mathematical explanation for the usefulness of the weighted average space gradient method, based on the assumption that the change of image concentration is one of the sine curves.

Figure 7:
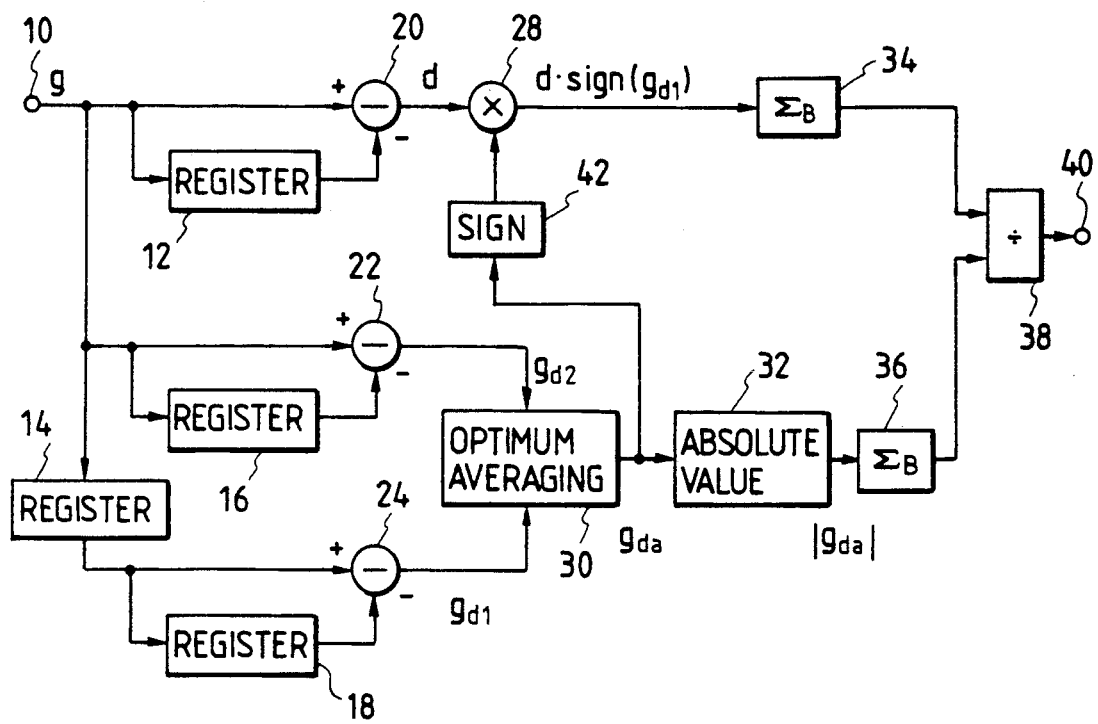
FIG. 7 shows the block diagram of another embodiment of the present invention, FIG. 8 compares the estimation results by a conventional example and the embodiment of FIG. 7.

With reference to FIG. 7, a second embodiment is explained. In the circuit of FIG. 1, the sign of the space gradient of the preceding image plane was used in order to obtain the numerator of the estimation formula, but it is also possible to use the sign of the value after the weighed averaging of the space gradient, that is, the output of optimum averaging circuit 30 in FIG. 1. In the latter case, the current image plane is referred to, not just for the magnitude of the space gradient but also for its sign, and improvement of characteristics can be expected. FIG. 7 shows a circuit block diagram of such modified embodiment. 42 represents a sign output circuit having the same function as that of the sign output circuit 26 in FIG. 1, but is different from FIG. 1 in that the output of the optimum averaging circuit 30 is used as the input. Other elements are the same as in FIG. 1 and they are numbered in the same way. In other words, the system is structured in such a way that the current image plane is referred to not just for the magnitude of the space gradient, but also for its signal.

Figure 8:
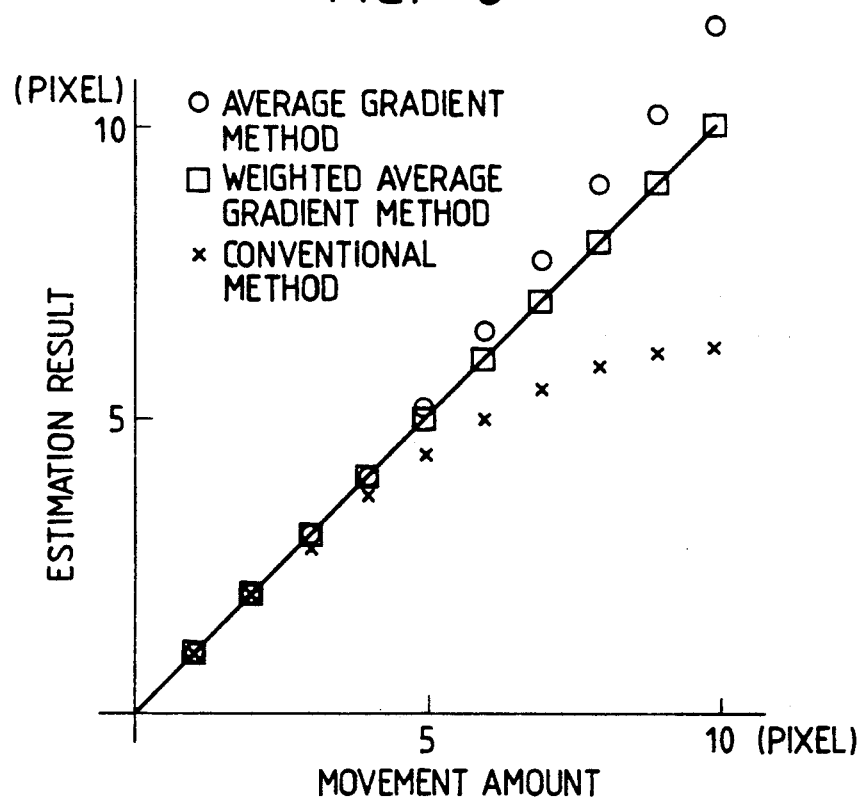

Using the 256×256×1 (byte) image as an example, the conventional time-space gradient method, the average gradient method by which the space gradients are averaged simply with the weight ratio of 1:1, and the weighed average gradient method in accordance with the embodiment of FIG. 7 are compared with respect to the image signals that have undergone low-pass filtering treatment. The results of comparison are shown in FIG. 8. In FIG. 8, "X" represents the estimation result by the conventional space time gradient method without averaging, "○" represents the estimation result by the average gradient method, and "□" represents the estimation result by the present embodiment. The weight was made to be (preceding image plane):(current image plane)=3:1. It is clear that the detection range has been substantially enhanced in comparison with the other two methods.

Figure 9:
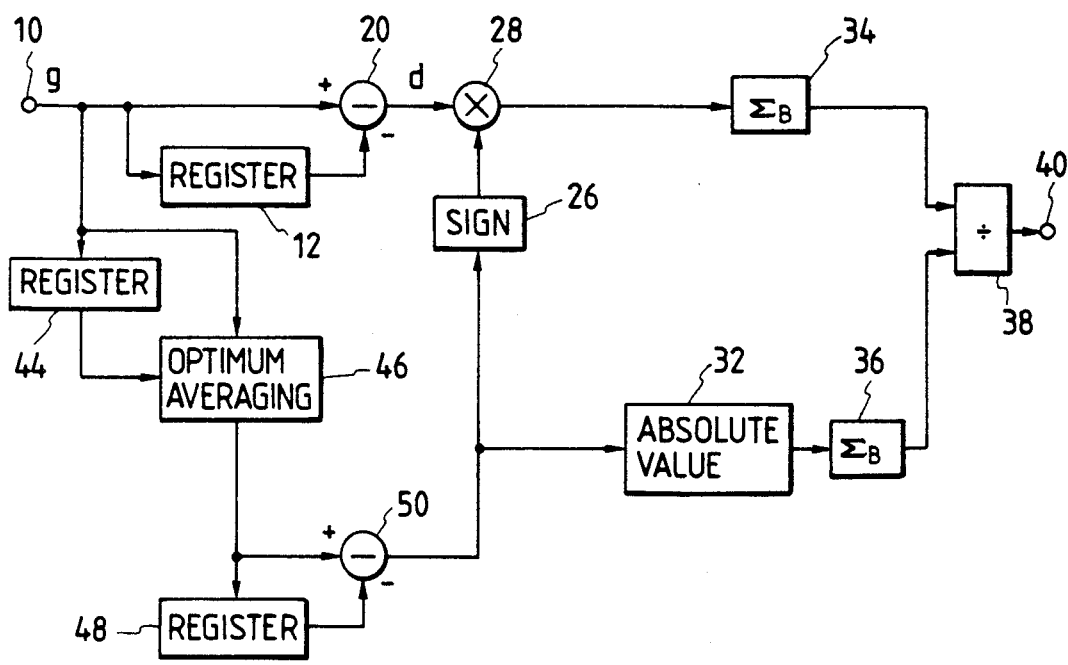
FIG. 9 shows the block diagram of a third embodiment of the present invention.

FIG. 9 shows a block diagram of yet another embodiment. The same elements as those in FIG. 1 are numbered in the same way. 44 represents a register which gives the time lag for 1 field (or frame), 46 represents a similar optimum averaging circuit as optimum averaging circuit 30 in FIG. 1, 48 represents a register which gives the time lag for the scanning time of several pixels, and 50 represents a subtractor. Optimum averaging circuit 46 averages, under a proper weight, the current image signal from input terminal 10 and the preceding image signal from register 44. Register 48 and subtractor 50 compute the space gradient from the output of the optimum averaging circuit 46, and the output of subtractor 50 is sent to sign output circuit 26 and absolute value circuit 32. The concentration difference "d" has been obtained by register 12 and subtractor 20, as was already explained above. Therefore, the same processing proceeds and the movement amount signal is obtained from output terminal 40.

In the system of FIG. 9, the register which gives the time lag for the scanning time of several pixels in the systems of FIG. 1 and FIG. 7 is not required, making it possible to simplify the hardware configuration.

As is easily understandable from the aforesaid explanation, the present invention has the advantage of enhancing the detection range of movement vector, without substantial extension of circuits.

Figure 10:
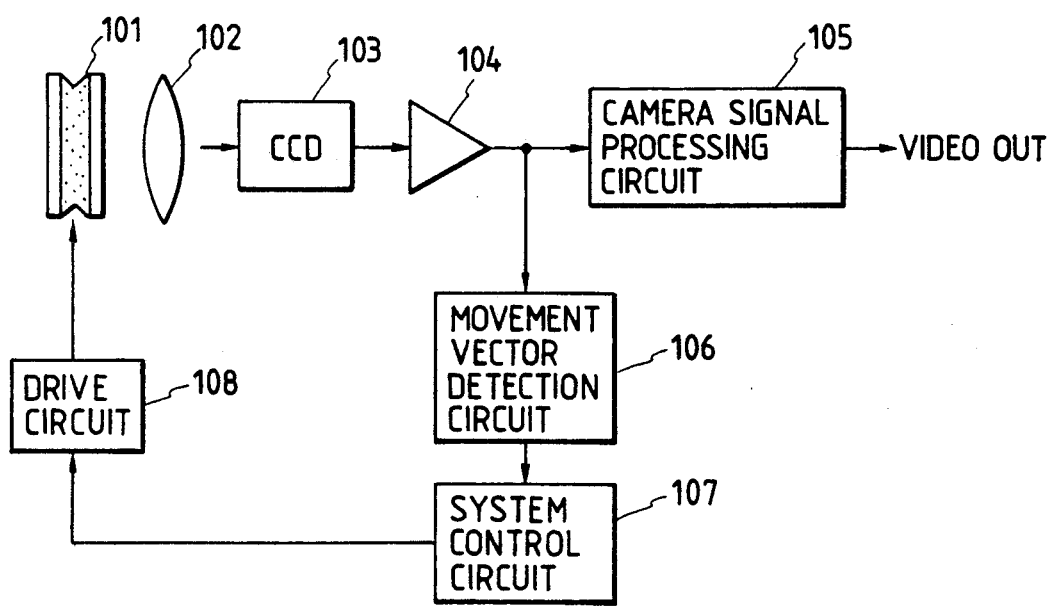

FIGS. 10 and 11 each show an example where each of the aforesaid movement vector detection circuits is applied to a video camera as the vibration correction (anti-vibration) device.

FIG. 10 shows an example which employs, as the anti-vibration unit, a movable top angle prism which optically corrects for the vibration by moving the light axis of the image lens. In FIG. 10, 101 represents a movable top angle prism which moves the direction of light axis of the image lens system, that is, the top angle thereof, and which, by way of example, is a pair of parallel glass sheets having a silicon-based fluid in-between. 102 represents an image lens; 103 represents a CCD or other image sensor which converts the optical image captured by image lens into electronic signals and transmits them as output; 104 represents a preamplifier; 105 represents a camera signal processing circuit which outputs the standardized image signals after giving blanking processing, addition of synchronizing signals, gamma correction and other processing to the image signals that are output from the image sensor; 106 represents the movement vector detection circuit described in the respective embodiments of FIGS. 1, 7 and 9; 107 represents the system control circuit which picks up image movement vector data supplied by movement vector detection circuit 106, computes the data on the drive direction of the movable top angle prism so as to offset the movement of the image by vibration, and computes the drive amount required for correction; and 108 represents the drive circuit which drives top angle prism 101 in accordance with the data computed by system control circuit 107.

In this way, movement vectors arising from image vibration (camera vibration) are detected by the movement vector detection circuit of each said embodiment, the direction and amount of drive for the movable top angle prism are computed in accordance with these movement vectors, and vibration correction is made by the drive of the movable top angle prism.

The explanation on of the mechanism of the movement vector detection circuit by itself is omitted here because it was made in the aforesaid embodiments.

FIG. 11 shows an example which employs no optical correction device, but corrects the movement of image by first taking the image temporarily into the memory device and then changing the read-out range from the memory device.

The same elements as those in FIG. 10 are numbered in the same way, and explanations thereof are omitted.

Image signals which are output from preamplifier 104 are converted to digital signals by the A/D converter 109 and are fed into the memory device of digital signal processing circuit 110. Memory control circuit 113 controls the rate and timing of the A/D conversion for the image take-up into the memory device as well as the timing and address of the write-in into the memory device. This memory control circuit 113 also controls the address and timing of read-out from the memory device.

The digital image signals that are read out from memory 110 are given various camera signal processings by camera signal processing circuit 111, are converted to analog signals by D/A conversion circuit 112, and then are output as image signals. It is also possible to set up the system in such a way that the digital signals are output as such.

Movement vector detection circuit 115 detects the movement vector caused by camera vibration, in the same way as in the embodiment of FIG. 1; and the movement vector thus detected is fed to system control circuit 114, which in turn computes the direction and magnitude of the image movement, based on the movement vector detected by movement vector detection circuit 115, and then based thereon controls memory control circuit 113 and controls the memory read-out range. That is, the memory takes up in advance the image in a larger image angle than that to be output, and at the time of memory read-out, the movement is corrected by changing the range of its read-out.

In the aforesaid system, it is possible to place the camera signal processing circuit downstream of D/A converter 112 and to have perform analog processing, but digital signal processing provides easier processing and less noise.

In this way, correction for vibration of the video camera can be made by the movement vector detection circuit of the present invention. The movement vector detection circuit is not only applicable to vibration correction, but also to camera panning detection and many other applications.

The present invention provides a video camera equipped with a high performance vibration correction function which has a very broad range of movement detection and is capable of detecting and making correction for both large and small movements.

We claim:

1. A movement detecting device comprising:
   (A) concentration difference operation means for operating a concentration difference between image planes;
   (B) space gradient operation means for operating a space gradient in the image plane;
   (C) averaging means for averaging, with giving predetermined weights, the outputs of said space gradient operation means for each of the image planes difference in time; and
   (D) movement vector operation means for operating the movement vectors of the image, based on the outputs of said concentration difference operation means and of said averaging means.

2. A movement detecting device according to claim 1, wherein said concentration difference operation means detects the time gradient of image planes between the fields or frames.

3. A movement detecting device according to claim 1, wherein said space gradient operation means detects the concentration difference among a predetermined number of pixels in the image plane.

4. A movement detecting device according to claim 1, wherein the weight given by said averaging means is greater for a preceding image plane than for a current image plane.

5. A movement detecting device according to claim 1, wherein said movement vector operation means outputs the aggregate total movement vector of all movement vectors in a predetermined block of the image plane.

6. A movement detecting device according to claim 5, wherein said movement vector operation means comprises:
   (a) correction means for detecting the sign of the said space gradient operation means, and for correcting the output of said concentration difference operation means in accordance with said sign;
   (b) absolute value operation means for providing the absolute value of the output of said averaging means;

(c) first totalizing means for operating the aggregate total of outputs of said absolute value operation means for said predetermined block;

(d) second totalizing means for operating the aggregate total of outputs of said concentration difference operation means, as corrected by said correction means, for said predetermined block; and (e) division means for operating the quotient of the outputs of said first totalizing means and said second totalizing means.

7. A movement detecting device according to claim 5, further comprising:

(a) correcting means for detecting the sign of the output of said averaging operation means, and for correcting the output of said concentration difference operation means in accordance with said sign;

(b) absolute value operation means for providing the absolute value of the output of said averaging means;

(c) first totalizing means for operating the aggregate total of outputs of said absolute value operation means for said predetermined block;

(d) second totalizing means for operating the aggregate total of outputs of said concentration difference operation means, as corrected by said correction means, for said predetermined block; and (e) division means for operating the quotient of the outputs of said first totalizing means and said second totalizing means.

8. A movement detecting device comprising:

(A) concentration difference operation means for operating a concentration difference between image planes;

(B) arranging means for averaging, with giving predetermined weights, the image planes different in time;

(C) space gradient operation means for operating the space gradient of the output of said averaging means; and (D) movement vector operation means for operating the movement vector of the time, based on the outputs of the said concentration difference operation means and of the said space gradient operation means.

9. A movement detecting device according to claim 8, wherein said concentration difference operation means detects the time gradient of image planes, and said space gradient operation means detects the concentration difference among a predetermined number of pixels in the image plane.

10. A movement detecting device according to claim 8, wherein the weight given by said averaging means is greater for a preceding image plane than for a current image plane.

11. A movement detecting device according to claim 8, which said movement vector operation means outputs the aggregate total movement vector of all movement vectors in a certain block of the image plane.

12. A movement detecting device according to claim 8, further comprising:

(a) correction means for detecting the sign of the output of said space gradient operation means, and for correcting the output of said concentration difference operation means in accordance with said sign;

(b) absolute value operation means for operating the absolute value of the output of said space gradient operation means;

(c) first totalizing means for operating the aggregate total of outputs of said absolute value operation means for said predetermined block;

(d) second totalizing means for operating the aggregate total of outputs of said concentration difference operation means, as corrected by said correction means, for said predetermined block and (e) division means for operating the quotient of the outputs of said first totalizing means and said second totalizing means.

13. A movement detecting device comprising:

(A) time gradient operation means for operating a time gradient between image planes; and (B) space gradient operation means for operating a space gradient in the image plane;

(C) averaging means for averaging, with giving predetermined weights, a plurality of outputs different in time, from said space gradient operation means; and (D) movement vector operation means for operating the movement vector of the image, based on the outputs of the said time gradient operation means and of said averaging means.

14. A movement detecting device according to claim 13, wherein said movement vector operation means operates the aggregate total of all movement vectors in a predetermined block in the image plane.

15. A movement detecting device according to claim 14, wherein said movement vector operation means comprises:

(a) correction means for detecting the sign of the said space gradient operation means, and for correcting the output of said time gradient operation means in accordance with said sign;

(b) absolute value operation means for operating the absolute value of the output of said averaging means;

(c) first totalizing means for operating the aggregate total of outputs of said absolute value operation means for said predetermined block;

(d) second totalizing means for operating the aggregate total of outputs of said concentration difference operation means, as corrected by said correction means, for said predetermined block; and (e) division means for operating the quotient of the outputs of said first totalizing means and the said second totalizing means.

16. A movement detecting device comprising:

(A) concentration difference operation means for operating a concentration difference between image planes;

(B) space gradient operation means for operating a space gradient in an image plane;

(C) averaging means for averaging, with giving predetermined weights, the output of each of the image planes different in time, from said space gradient operation means;

(D) movement vector operation means for operating the movement vector of the image, based on the outputs of the said concentration difference operation means and of the said averaging means; and (E) correction means for correcting the movement of said image, in accordance with the output of the said movement vector operation means.

17. A movement detecting device according to claim 16, further comprising memory means for memorizing an image of a preceding image plane, wherein a range of read-out of the memorized image from said memory means can be changed in accordance with the output of said movement vector operation means.

18. A movement detecting device according to claim 16, wherein said concentration difference operation means detects the image time gradient between fields or frames.

19. A movement detecting device according to claim 16, wherein said space gradient operation means detects the concentration difference among a predetermined number of pixels in the image plane.

20. A movement detecting device according to claim 16, wherein the weight given by said averaging means is greater for a preceding image plane than for a current plane.

21. A movement detecting device according to claim 16, wherein said movement vector operation means outputs the aggregate total movement vector of all movement vectors in a predetermined block of the image plane.

22. A movement detecting device according to claim 16, wherein said correction means is an optical correction means which offsets the moment of image by changing an apex angle of a photographing light axis.

23. A movement detecting device according to claim 22, wherein said correction means comprises a variable apex angle prism.

24. A video camera comprising:
(A) image pickup means;
(B) time gradient operation means for operating the time gradient between image planes, out of an image pickup signal output from said image pickup means;
(C) space gradient operation means for operating a space gradient in an image plane from said image pickup signal;
(D) averaging means for averaging, with giving a predetermined weight, a plurality of outputs of said space gradient operation means;
(E) movement vector operation means for operating the movement vector of the image, based on the outputs of the said time gradient operation means and of said averaging means; and
(F) correction means for correcting the movement of said image, in accordance with the output of the said movement vector operation means.

25. A movement detecting device according to claim 24, wherein said movement vector operation means outputs the aggregate total movement vector of all movement vectors in a predetermined block of the image plane.

26. A movement detecting device according to claim 24, wherein said adjustment is an optical correction means which offsets the movement of image by changing an apex angle of a photographing light axis.

27. A movement detecting device according to claim 24, further comprising memory means for memorizing an image of a preceding image plane, wherein a range of read-out of the memorized image from said memory means can be changed in accordance with the output of said movement vector operation means.

* * * * *

UNITED STATES PATENT AND TRADEMARK OFFICE
CERTIFICATE OF CORRECTION

PATENT NO. : 5,173,770

DATED : December 22, 1992

INVENTOR(S) : Toshiaki Kondo, et al

It is certified that error appears in the above-indentified patent and that said Letters Patent is hereby corrected as shown below:

On the title page, Item
[57] ABSTRACT

Line 1, "Movement" should read --A movement--.
    Line 9, "computes" should read --compute--.

COLUMN 1

Line 14, "method" should read --method,--.
    Line 18, "Com./" should read --Com.,--.
    Line 19, "(Apr. 1975)" should read --(Apr. 1975),--
          and "space" should read --time-space--.
    Line 37, "liner," should read --linear,--.

COLUMN 2

Line 3, "giving" should read --given--.
    Line 39, "giving" should read --given--.
    Line 60, "giving" should read --given--.

COLUMN 3

Line 2, "more-fully" should read --more fully--.
    Line 44, "subtractors;" should read --subtracters;--.
    Line 47, "subtractor 24;" should read --subtracter 24);--.
    Line 64, "subtractor 20." should read --subtracter 20.--.
    Line 67, "subtractor 22," should read --subtracter 22,--.

UNITED STATES PATENT AND TRADEMARK OFFICE
CERTIFICATE OF CORRECTION

PATENT NO. : 5,173,770

DATED : December 22, 1992

INVENTOR(S) : Toshiaki Kondo, et al

It is certified that error appears in the above-indentified patent and that said Letters Patent is hereby corrected as shown below:

COLUMN 4

Line 1, "subtractor 24" should read --subtracter 24--.
Line 20, "$g_{d1}$ quotes to" should read --"$g_{d1}$"--.
Line 21, "$g_{d1}$ quotes to" should read --"$g_{d1}$"--.
Line 23, "subtractor 20)." should read
--subtracter 20).--.
Line 57, "= A{sin ωx - sin ω(x - α)}" should read
--= A{sin ωx - sin ω(x - α)}
$g_{d1}(x) = \partial g_1/\partial x$ = Aω cos ωx--.

COLUMN 5

Line 5, "illustrations of" should read --illustrates--.
Line 18, "α=T/2;" should read --α=T/2.--.
Line 19, "phenomena" should read --phenomenon--.
Line 62, "method" should read --method is employed--.

COLUMN 6

Line 47, "subtractor." should read --subtracter.--.
Line 51, " tractor 50" should read --tracter 50--.
Line 53, "subtractor 50" should read --subtracter 50--.
Line 55, "subtractor 20," should read --subtracter 20,--.

COLUMN 7

Line 38, "on of" should read --of--.

UNITED STATES PATENT AND TRADEMARK OFFICE
CERTIFICATE OF CORRECTION

PATENT NO. : 5,173,770

DATED : December 22, 1992

INVENTOR(S) : Toshiaki Kondo, et al

It is certified that error appears in the above-indentified patent and that said Letters Patent is hereby corrected as shown below:

COLUMN 8

Line 12, "have" should read --have it--.
Line 33, "giving" should read --given--.

COLUMN 9

Line 34, "arranging means" should read --averaging means-- and "giving" should read --given--.
Line 56, "which" should read --wherein--.

COLUMN 10

Line 7, "block and" should read --block; and--.
Line 13, "and" should be deleted.
Line 16, "giving" should read --given--.
Line 46, "the" should be deleted.
Line 54, "giving" should read --given--.

COLUMN 11

Line 14, "plane." should read --image plane.--.
Line 22, "moment" should read --movement--.

UNITED STATES PATENT AND TRADEMARK OFFICE
CERTIFICATE OF CORRECTION

PATENT NO. : 5,173,770

DATED : December 22, 1992

INVENTOR(S) : Toshiaki Kondo, et al

It is certified that error appears in the above-indentified patent and that said Letters Patent is hereby corrected as shown below:

COLUMN 12

Line 6, "giving a" should read --given--.
Line 22, "said adjustment" should read --said correction means--.

Signed and Sealed this

Eighth Day of February, 1994

BRUCE LEHMAN

*Attest:*

*Attesting Officer*   *Commissioner of Patents and Trademarks*